United States Patent [19]

Nishikawa et al.

[11] Patent Number: 5,268,227
[45] Date of Patent: Dec. 7, 1993

[54] MAGNETIC RECORDING MEDIUM COMPRISING A FERROMAGNETIC METALLIC THEN FILM HAVING A TOP COAT OF (A) A HYDROCARBONSULFURIC OR HYDROCARBONSULFONIC ACID OR SALT AND (B) A FLUORINATED POLYETHER

[75] Inventors: Yasuo Nishikawa; Kunihiko Sano; Hiroyuki Iwasaki, all of Kanagawa, Japan

[73] Assignee: Fuji Photo Film Co., Ltd., Kanagawa, Japan

[21] Appl. No.: 858,432

[22] Filed: Mar. 24, 1992

Related U.S. Application Data

[63] Continuation of Ser. No. 552,034, Jul. 13, 1990, abandoned.

[30] Foreign Application Priority Data

Jul. 14, 1989 [JP] Japan .................................. 1-182133

[51] Int. Cl.$^5$ .............................................. G11B 5/00
[52] U.S. Cl. .................................... 428/336; 428/421; 428/694 TP; 428/694 TF
[58] Field of Search ............... 428/336, 694, 695, 900, 428/421, 422, 694 TP, 694 TF

[56] References Cited

U.S. PATENT DOCUMENTS

| | | | |
|---|---|---|---|
| 4,267,238 | 5/1981 | Chernega | 428/422 |
| 4,786,544 | 11/1988 | Saito | 428/143 |
| 4,857,402 | 8/1989 | Nishikawa et al. | 428/336 |

Primary Examiner—Stevan A. Resan
Attorney, Agent, or Firm—Sughrue, Mion, Zinn, Macpeak & Seas

[57] ABSTRACT

A magnetic recording medium comprising a non-magnetic support having thereon a magnetic layer, wherein said magnetic layer contains (a) an oxo acid having a hydrocarbon group or a salt thereof, and (b) a fluorinated polyether.

8 Claims, No Drawings

MAGNETIC RECORDING MEDIUM COMPRISING A FERROMAGNETIC METALLIC THEN FILM HAVING A TOP COAT OF (A) A HYDROCARBONSULFURIC OR HYDROCARBONSULFONIC ACID OR SALT AND (B) A FLUORINATED POLYETHER

This is a continuation of application Ser. No. 07/552,034 filed Jul. 13, 1990 abandoned.

FIELD OF THE INVENTION

This invention relates to a magnetic recording medium comprising a non-magnetic support having thereon a magnetic layer composed of ferromagnetic powder dispersed in a binder resin. More particularly, it relates to a magnetic recording medium which is excellent in running properties and durability under a wide range of temperature and humidity conditions

BACKGROUND OF THE INVENTION

Significantly higher-density recording has been demanded in connection with the development of magnetic recording mediums in recent years. Attempts to smooth the surface of the magnetic layer have been made as a possible means for attaining enhanced high-density recording.

However, when the surface of the magnetic layer is smoothed, a coefficient of friction of the magnetic layer with each part it comes into contact with in a recording and reproducing apparatus is increased during the running of magnetic recording mediums. As a result, there is a possibility that running troubles in use are caused, that the magnetic layer is damaged to thereby increase drop-out, and that the magnetic layer is peeled off its non-magnetic support.

Additionally, in magnetic recording mediums having a magnetic layer composed of a ferromagnetic metallic thin film, that is, metallic thin film type magnetic recording mediums which are designed for use as high-density recording mediums and extensively studied to develop and bring them to practical use towards that objective, the surface of the magnetic layer is very smooth so that the above-described problems caused by increased coefficients of friction are even more pronounced.

To solve the above problems, prior attempts have been made to incorporate lubricants such as fatty acids, fatty acid esters, hydrocarbons or silicone compounds into the magnetic layer or the surface thereof. However, magnetic layers have insufficient durability when incorporating these conventional lubricants.

With the popularization of VTR, personal computers and word processors, floppy disc drive type apparatuses have become more popular in recent years and magnetic recording mediums have been used over a wide range of environments such as under low-temperature conditions and under high-temperature and high-humidity conditions.

Accordingly, magnetic recording mediums are demanded which have stable running durability under a wide range of environmental conditions.

The application of fluorinated oils such as perfluoropolyethers to metallic thin film type magnetic mediums has been examined. For example, U.S. Pat. Nos. 4,267,238 and 4,268,556, West German Patent 3,000,583 and JP-B-60-10368 (the term "JP-B" as used herein means an "examined Japanese patent publication") disclose perfluoropolyethers whose terminals are modified by addition of polar groups to enhance fixation to the surface of the magnetic layer.

Further, attempts have been made to provide good lubricity as well as fixation to the surface of the magnetic layer by using a combination of a perfluoropolyether having a polar group with a perfluoropolyether having no polar group as described in JP-A-61-113126 (the term "JP-A" as used herein means an "unexamined published Japanese patent application") and U.S. Pat. No. 4,682,378.

However, the above-described coefficient of friction problem could not be adequately solved by using these conventional perfluoropolyether lubricants.

The present invention is intended to solve such problems associated with the prior art as mentioned above.

SUMMARY OF THE INVENTION

An object of the present invention is to provide a magnetic recording medium which is excellent in running durability under a wide range of environmental conditions ranging from low temperature to high temperature and high humidity in particular.

The above-described object has been achieved by providing a magnetic recording medium comprising a non-magnetic support having thereon a magnetic layer, wherein (a) an oxo acid having a hydrocarbon group or a salt thereof, and (b) a fluorinated polyether are present on an upper surface of the magnetic layer or in the interior of the magnetic layer.

DETAILED DESCRIPTION OF THE INVENTION

The present invention will be explained in greater detail below.

The oxo acid having a hydrocarbon group or a salt thereof to be provided on the surface of the magnetic layer of the magnetic recording medium of the present invention or in the interior thereof has high fixation property to the magnetic layer and therefore has an effect of greatly reducing the coefficient of friction of the magnetic layer. The fluorinated polyether remains in a fluid state over a wide temperature range and possesses adequate affinity with the surface of the magnetic layer and, hence, it exhibits good lubricity.

Accordingly, the magnetic recording medium of the present invention has good running durability under a wide range of environmental conditions due to the retention of the above-described two kinds of the compounds having the above characteristics on the surface or in the interior of the magnetic layer, and comparable good running durability is not attainable with conventional magnetic recording mediums.

When the oxo acid having a hydrocarbon group or a salt thereof and a fluorinated polyether are provided by the magnetic layer of the magnetic recording medium of the present invention, these two kinds of compounds are provided either on the surface of the magnetic layer or in the interior of the magnetic layer. When the magnetic recording medium is a coating type having a magnetic layer mainly composed of ferromagnetic powder and a binder resin, the compounds may be provided on the surface of the magnetic layer or in the interior thereof. However, when the magnetic recording medium is a metallic thin film type magnetic recording medium having a ferromagnetic metallic thin film magnetic layer, the compounds are generally provided on the surface of the magnetic layer.

The aforesaid features of the magnetic recording medium of the present invention is particularly remarkable when the oxo acid having a hydrocarbon group or a salt thereof is a hydrocarbon-substituted sulfuric ester or a hydrocarbonsulfonic acid or a salt thereof. Further, when the magnetic layer is a ferromagnetic metallic thin film, the present invention is particularly effective.

Examples of the oxo acid having a hydrocarbon group or salts thereof which can be used in the present invention include, RCOOH, RCOOM, ROCOOH, ROCOOM, RSO$_3$H, RSO$_3$M, ROSO$_3$H, ROSO$_3$M, RPO$_3$H$_2$, RPO$_3$M$_2$, RPO$_3$HM, ROPO$_3$H$_2$, ROPO$_3$M$_2$, ROPO$_3$HM, RSO$_2$H, RSO$_2$M, ROSO$_2$H, ROSO$_2$M, RSO$_3$M, RPO$_2$H$_2$, RPO$_2$M$_2$, RPO$_2$HM, ROPO$_2$H$_2$, ROPO$_2$M$_2$, ROPO$_2$HM, RBO$_2$H$_2$, RBO$_2$M$_2$, RBO$_2$HM, ROBO$_2$H$_2$, ROBO$_2$M$_2$ and ROBO$_2$HM, wherein R is a hydrocarbon group having 6 to 22 carbon atoms, preferably 12 to 18 carbon atoms and M is an atom such as Na, K, Li, NH$_4$, Zn$_{(\frac{1}{2})}$, Be$_{(\frac{1}{2})}$, Mg$_{(\frac{1}{2})}$, Ca$_{(\frac{1}{2})}$, Sr$_{(\frac{1}{2})}$, Co$_{(\frac{1}{2})}$, Ni$_{(\frac{1}{2})}$, Cu$_{(\frac{1}{2})}$, or an atomic group such as primary ammonium secondary ammonium, tertiary ammonium or quaternary ammonium, but M is not a hydrogen atom.

More specifically, examples of the oxo acid having a hydrocarbon group or salts thereof include compounds represented by the following chemical formulas (1) to (35). CH$_3$(CH$_2$)$_{10}$COOH (1), CH$_3$(CH$_2$)$_{12}$COOH (2), CH$_3$(CH$_2$)$_{14}$COOH (3), CH$_3$(CH$_2$)$_{16}$COOH (4), CH$_3$(CH$_2$)$_{16}$COONa (5), CH$_3$(CH$_2$)$_{16}$OCOOH (6), CH$_3$(CH$_2$)$_{16}$OCOONa (7), CH$_3$(CH$_2$)$_{16}$SO$_3$H (8), CH$_3$(CH$_2$)$_{16}$SO$_3$Na (9), CH$_3$(CH$_2$)$_{16}$OSO$_3$H (10), CH$_3$(CH$_2$)$_{16}$OSO$_3$Na (11), CH$_3$(CH$_2$)$_{16}$PO$_3$H$_2$ (12), CH$_3$(CH$_2$)$_{16}$PO$_3$Na$_2$ (13), CH$_3$(CH$_2$)$_{16}$PO$_3$HNa (14), CH$_3$(CH$_2$)$_{16}$OPO$_3$H$_2$ (15), CH$_3$(CH$_2$)$_{16}$OPO$_3$Na$_2$ (16), CH$_3$(CH$_2$)$_{16}$OPO$_3$HNa (17), CH$_3$(CH$_2$)$_{16}$SO$_2$H (18), CH$_3$(CH$_2$)$_{16}$SO$_2$Na (19), CH$_3$(CH$_2$)$_{16}$OSO$_2$H (20), CH$_3$(CH$_2$)$_{16}$OSO$_2$Na (21), CH$_3$(CH$_2$)$_{16}$SO$_3$Na (22), CH$_3$(CH$_2$)$_{16}$PO$_2$H$_2$ (23), CH$_3$(CH$_2$)$_{16}$PO$_2$Na$_2$ (24), CH$_3$(CH$_2$)$_{16}$PO$_2$HNa (25), CH$_3$(CH$_2$)$_{16}$OPO$_2$H$_2$ (26), CH$_3$(CH$_2$)$_{17}$OPO$_2$H$_2$ (27), CH$_3$(CH$_2$)$_{16}$OPO$_2$Na$_2$ (28), CH$_3$(CH$_2$)$_{16}$OPO$_2$HNa (29), CH$_3$(CH$_2$)$_{16}$BO$_2$H$_2$ (30), CH$_3$(CH$_2$)$_{16}$BO$_2$Na$_2$ (31), CH$_3$(CH$_2$)$_{16}$BO$_2$HNa (32), CH$_3$(CH$_2$)$_{16}$OBO$_2$H$_2$ (33), CH$_3$(CH$_2$)$_{16}$OBO$_2$Na$_2$ (34), CH$_3$(CH$_2$)$_{16}$OBO$_2$HNa (35).

Among them, the oxo acids originating from sulfur can be preferably used for the magnetic recording medium of the present invention, because they are excellent in lubricity as well as fixation to the surface of the magnetic layer.

The fluorinated polyethers which can be used for the magnetic recording medium of the present invention have a number-average molecular weight of 1,000 to 15,000, preferably 1,500 to 10,000 and include terminal-modified type and terminal-unmodified type.

Examples of terminal-modifying groups for the terminal-modified type fluorinated polyethers include CH$_3$OCO—, C$_2$H$_5$COCO—, C$_{12}$H$_{25}$OCO—, HCOO—, CH$_3$COO—, C$_2$H$_5$COO—, C$_{17}$H$_{35}$COO—, C$_6$H$_5$OCO—, C$_6$H$_5$COO—, —OH, and oxo acid type terminal groups such as —COOH and —SO$_3$H.

Examples of the terminal-modified type fluorinated polyethers include compounds represented by the following chemical formulas (36) to (42).

$$C_6H_5OCOCF_2\text{—}O(CF_2O)_m\text{—}(CF_2CF_2O)_n\text{—}CF_2COOC_6H_5 \quad (36)$$

$$CF_3\text{—}O(CF_2O)_m\text{—}(CF_2CF_2O)_n\text{—}CF_2COOCH_3 \quad (37)$$

$$CF_3\text{—}O(CF_2O)_m\text{—}(CF_2CF_2O)_n\text{—}CF_2OH \quad (38)$$

$$HOCOCF_2\text{—}O(CF_2O)_m\text{—}(CF_2CF_2O)_n\text{—}CF_2COOH \quad (39)$$

$$CH_3OCOCF_2\text{—}O(CF_2CF_2O)_n\text{—}CF_2COOCH_3 \quad (40)$$

$$HOCF_2\text{—}O(CF_2O)_m\text{—}(CF_2CF_2O)_n\text{—}CF_2OH \quad (41)$$

$$C_{11}H_{23}COOCH_2CF_2\text{—}O(CF_2O)_m\text{—}(CF_2CF_2O)_n\text{—}CF_2CH_2OCOC_{11}H_{23} \quad (42)$$

Examples of the terminal-unmodified type perfluoropolyethers include compounds represented by the following chemical formulas (43) to (45).

$$CF_3\text{—}O(CF_2O)_m\text{—}(CF_2CF_2O)_n\text{—}CF_3 \quad (43)$$

$$CF_3\text{—}O(CF_2CF)CF_3)O)_n\text{—}CF_3 \quad (44)$$

$$CF_3\text{—}O(CF_2CF_2CF_2O)_n\text{—}CF_3 \quad (45)$$

In the formulas (36) to (39) and (41) to (43), m and n, each represents a positive integer and the sum of m and n ranges from 6 to 15, preferably 8 to 12. Further, in the formulas (40), (44) and (45), n represents a positive integer of from 4 to 25, preferably 8 to 15.

The total amount of the oxo acid having a hydrocarbon group or a salt thereof and the fluorinated polyether to be provided on the surface of the magnetic layer of the magnetic recording medium of the present invention or in the interior thereof is preferably 0.5 to 10 parts by weight per 100 parts by weight of ferromagnetic powder when contained in the interior of the magnetic layer and preferably 1 to 100 mg/m$^2$ when applied on the surface of the magnetic layer.

When the total amount is too small, the effect of the present invention cannot be sufficiently obtained, while when the total amount is too large, sticking is caused during running, or a problem is encountered when the compounds are contained in the interior of the magnetic layer in that the compounds separate from the binder resin in the magnetic layer and migrate out of the layer, and, consequently, running durability is lowered.

The mixing ratio of the oxo acid having a hydrocarbon group or a salt thereof and the fluorinated polyether to be applied to the magnetic layer of the magnetic recording medium of the present invention is from 1:10 to 10:1, preferably from 1:5 to 5:1 by weight. When the ratio of the oxo acid having a hydrocarbon group or a salt thereof to be mixed is too low, a coefficient of friction is increased, while when the ratio of the fluorinated polyether is too low, durability is reduced.

Other lubricants can be used together with the above compounds in the magnetic recording medium of the present invention.

Examples of other lubricants which can be used together with the compounds of the present invention include saturated or unsaturated fatty acids such as myristic acid, stearic acid and oleic acid; metallic soap; fatty aid amides, fatty acid esters such as various monoester, esters of polyhydric alcohols such as sorbitan and glycerol and esters with polybasic acids; higher aliphatic alcohols, monoalkyl phosphates, trialkyl phosphates, paraffins, silicone oil, animal and vegetable oil, mineral oil and organic compounds such as higher aliphatic amines; inorganic powders such as graphite, silica, molybdenum disulfide and tungsten disulfide; powders of resin such as polyethylene, polypropylene, polyvinyl chloride, ethylene-vinyl chloride copolymer and polytetrafluoroethylene; α-olefin polymers, unsaturated hydrocarbons which are liquid at room temperature and fluorocarbons.

The amounts of the other lubricants used together with the compounds of the present invention vary depending on the intended use, but are preferably 1/10 times to twice the weight of the aforesaid oxo acid compound of the present invention.

As noted above, the oxo acid having a hydrocarbon group or a salt thereof and the perfluoropolyether used in the magnetic recording medium of the present invention are provided on the surface of the magnetic layer or in the interior thereof.

Examples of methods for providing them on the surface of the magnetic layer include a method wherein a solution of the compounds in an organic solvent is coated on or sprayed on a substrate and then dried, and a method wherein a substrate is immersed in the solution to allow the compounds to be adsorbed by the substrate and also the Langmuir-Blodgett process well known to those of skill in the art.

When the magnetic recording medium is the coating type, there is no particular limitation with regard to the particle size and shape of ferromagnetic powder to be used. Generally, the powder is used in the form of needle, granule, dice, rice grain or plate. It is preferred from the viewpoint of electromagnetic transduction characteristics that the crystallite size of the powder is not larger than 450 Å as measured by X-ray diffractometry.

When the magnetic recording medium of the present invention is the coating type, conventional resin can be used as binder resins for the magnetic layer without particular limitation.

Examples of the binder resins include thermoplastic resins and thermosetting resins such as vinyl chloride-vinyl acetate copolymer, vinyl chloride-vinyl acetate-vinyl alcohol copolymer, vinyl chloride-maleic acid-acrylic acid copolymer, vinyl chloride-vinylidene chloride copolymer, vinyl chloride-acrylonitrile copolymer, ethylene-vinyl acetate copolymer, cellulose derivatives such as nitrocellulose, acrylic resins, polyvinyl acetal resin, polyvinyl butyral resins, epoxy resins, phenoxy resins, polyurethane resins and polycarbonate polyurethane resins.

One or more polar groups such as epoxy group, carboxyl group, hydroxyl group, amino group, $-SO_3M'$, $-OSO_3M'$ or $-PO_3M'_2$ (wherein $M'$ is a hydrogen atom, an alkali metal or ammonium and when one group has a plurality of $M'$ constituents, the $M'$ constituents may be the same or different) may be introduced into the molecules of the binder resins to improve the dispersibility of ferromagnetic powder and the durability of the magnetic layer. The amount of the polar group to be introduced is preferably $10^{-7}$ to $10^{-3}$ equivalents, particularly preferably $10^{-6}$ to $10^{-4}$ equivalents per gram of the binder resin.

Further, polyisocyanate compounds may be used as curing agents for the binder resins to further improve the physical properties of the magnetic layer of the magnetic recording medium.

Furthermore, acrylic ester oligomers and monomers may be used as binder components and cured by the irradiation from a radiation source.

Examples of materials for the non-magnetic support include polyesters such as polyethylene terephthalate and polyethylene-2,6-naphthalate; polyolefins such as polyethylene and polypropylene; cellulos derivatives such as cellulose triacetate; and resins such as polycarbonates, polyimides and polyamideimides. The surface of the non-magnetic support may be metallized by a metal such as aluminum.

The thickness of the non-magnetic support is generally 3 to 100 μm, and is preferably 3 to 20 μm for magnetic tape and preferably 20 to 100 μm for magnetic disc.

The content of the whole binder in the magnetic layer of the magnetic recording medium of the present invention is 10 to 100 parts by weight, preferably 20 to 40 parts by weight per 100 parts by weight of ferromagnetic powder.

It is preferred that the magnetic layer of the magnetic recording medium of the present invention contains inorganic particles having a Mohs hardness of at least 5 as abrasive.

Any of inorganic particles can be used, so long as they have a Mohs hardness of at least 5. Examples of inorganic particles having a Mohs hardness of at least 5 include $Al_2O_3$ (Mohs hardness 9), TiO (Mohs hardness 6), $TiO_2$ (Mohs hardness 6.5), $SiO_2$ (Mohs hardness 7), $SnO_2$ (Mohs hardness 6.5), $Cr_2O_3$ (Mohs hardness 9) and $\alpha\text{-}Fe_2O_3$ (Mohs hardness 5.5). These compounds may be used either alone or as a mixture of two or more of them.

Inorganic particles having a Mohs hardness of at least 8 are particularly preferred. When inorganic particles having a Mohs hardness of lower than 5 are used, inorganic particles are liable to drop out from the magnetic layer, and such particles have a small effect of abrading the head. Hence, the clogging of head is liable to be caused and running durability becomes poor.

The content of inorganic particles is generally 0.1 to 20 parts by weight, preferably 1 to 10 parts by weight per 100 parts by weight of ferromagnetic powder.

It is preferred that the magnetic layer contains carbon black having an average particle diameter of particularly preferably 10 to 300 nm (Nano meter = $10^{-9}$ m) in addition to the above inorganic particles.

An embodiment of the process for producing the magnetic recording medium of the present invention will be illustrated below.

When the magnetic recording medium is the coating type magnetic recording medium, ferromagnetic powder, the binder resin, the oxo acid or a salt thereof, the fluorinated polyether, and other optional fillers and additives are kneaded with a solvent to prepare a magnetic coating material. Solvents conventionally used in the preparation of magnetic recording mediums can be used as the solvents for use in the kneading.

The above ingredients may be added in any order without particular limitation with regard to the method of kneading.

Conventional additives such as dispersant, antistatic agent, lubricant, for example, may be added in the preparation of the magnetic coating material.

Conventional dispersants can be used. Examples of the dispersants include fatty acids having 12 to 22 carbon atoms, salts and esters thereof, compounds wherein a part or the whole of hydrogen atoms of the fatty acids is replaced with fluoring atom, amides of the fatty acids, aliphatic amines, higher alcohols, polyalkylene oxide alkylphosphoric esters, alkylphosphoric esters, alkylboric esters, sarcosinates, alkyl ether esters, trialkylpolyolefins, oxy quaternary ammonium salts and lecithin.

The dispersants are used in an amount of generally 0.1 to 10 parts by weight per 100 parts by weight of ferromagnetic powder.

Examples of the antistatic agent include electrically conductive powders such as carbon black and carbon black-grafted polymers; natural surfactants such as saponin; nonionic surfactants such as alkylene oxide series surfactants, glycerol series surfactants and glycidol series surfactants; cationic surfactants such as higher alkylamines, quaternary ammonium salts, salts of heterocyclic compounds such as pyridine, phosphoniums and sulfoniums; anionic surfactants having an acid group such as carboxylic acid, phosphoric acid or sulfuric ester group; and ampholytic surfactants such as amino acids, amino-sulfuric acids and sulfuric esters or phosphoric esters of aminoalcohols. When electrically conductive fine powders are used a the antistatic agent, they are used in an amount of 0.1 to 10 parts by weight per 100 parts by weight of ferromagnetic powder, while when the surfactants are used, they are used in an amount of 0.12 to 10 parts by weight per 100 parts by weight of ferromagnetic powder.

The aforesaid additives such as dispersant, antistatic agent and lubricant are not described to have only the aforesaid effects in a limited sense. For example, the dispersant may additionally function as a lubricant or an antistatic agent. Accordingly, the effect and function derived from the compounds as classified above should not be construed as limited to the above-described general classifications. When a material having two or more effects and functions i used, the amount of the multi-functional material to be added should be determined by taking into consideration the total effects and functions derivable therefrom.

The thus-prepared magnetic coating material is coated on the non-magnetic support The support may be coated directly with the coating material, or may be coated through an interlayer such as an adhesive layer. The term "interlayer" as used herein refers to a single layer composed of an adhesive layer or a composite layer composed of non-magnetic fine particles such as carbon black dispersed in a binder.

The binder for the interlayer containing carbon can be arbitrarily chosen from among various binder resins conventionally used for the magnetic layers The particle size of carbon is preferably 10 to 50 nm, and the ratio of the binder to carbon is preferably from 100:10 to 100:150 by weight. The thickness of the interlayer is preferably 0.1 to 2 µm for the single adhesive layer and 0.5 to 4 µm for the composite layer containing non-magnetic powder.

The interlayer may contain a lubricant which is the same as or different from those used for the magnetic layer.

The details of method for dispersing ferromagnetic powder in the binder resin and method for coating the non-magnetic support with the coating material are described in JP-A-54 46011 and JP-A-54-21805.

The thickness of the magnetic layer thus coated is generally about 0.5 to 10 µm, preferably 0.7 to 6.0 µm as dry thickness.

When the magnetic recording medium is used in the form of a tape, the magnetic layer coated on the non-magnetic support is generally subjected to a treatment of orienting the ferromagnetic powder in the magnetic layer, that is, a magnetic field orientation treatment and then dried. When the magnetic recording medium is used in the form of a disc, the magnetic layer is subjected to a non-orienting treatment to remove the anisotropy of magnetic characteristics. Thereafter, the magnetic layer is optionally subjected to a surface smoothing treatment.

Ferromagnetic metallic thin film is formed from a material such as iron, cobalt, nickel, other ferromagnetic metal or ferromagnetic alloy such as Fe-Co, Fe Ni, Co-Ni, Fe-Rh, Co-P, Co-B, Co-Y, Co-La, Co-Ce, Co-Pt, Co-Sm, Co-Mn, Co-Cr, Fe-Co-Ni, Co-Ni-P, Co-Ni B, Co-Ni-Ag, Co-Ni-Nd, Co-Ni-Ce, Co-Ni-Zn, Co-Ni-Cu, Co Ni-W or Co-Ni-Re by means of electroplating, electroless plating, vapor phase plating, sputtering process, vapor deposition, ion plating or the like. When the film is used as the magnetic recording medium, the thickness of film is in the range of 0.02 to 2 µm, preferably 0.05 to 0.4 µm.

When oxygen or nitrogen is introduced into the ferromagnetic metallic thin film by carrying out vapor deposition in an oxygen or nitrogen stream in the formation of the metallic thin film, electromagnetic transduction characteristics and durability can be further improved. In addition to oxygen, N, Cr, Ga, As, Sr, Zr, Nb, Mo, Rh, Pd, Sn, Sb, Te, Pm, Re, Os, Ir, Au, Hg, Pb, Bi or Mg may be contained.

When the ferromagnetic metallic thin film magnetic layer has protrusions having a height of 1 to 500 nm, running properties and durability in particular are superior, though there is no particular limitation with regard to the surface profile of the magnetic layer.

The thickness of the non-magnetic support used for the metallic thin film type magnetic recording medium is preferably 4 to 50 µm. If desired, an undercoat layer may be provided on the surface of the non-magnetic support to improve the adhesion of the ferromagnetic metallic thin film and magnetic characteristics.

Examples of the non-magnetic support used for the metallic thin film type magnetic recording medium include plastic bases such as polyethylene terephthalate, polyimides, polyamides, polyvinyl chloride, cellulose triacetate, polycarbonates, polyethylene naphthalate and polyphenylene sulfide and Al, Ti and stainless steel.

It is effective to provide fine protrusions on the surface of the non-magnetic support (consequently, complementary unevenness will be formed on the surface of the magnetic layer) before the formation of the metallic thin film to improve durability, as described in U.S. Pat. No. 4,540,618. The density of the fine protrusions to be provided is preferably $2 \times 10^6$ to $2 \times 10^8$ protrusions/mm$^2$, and the height of each protrusion is preferably 1 to 50 nm.

The magnetic recording mediums of the present invention are excellent in running durability under a wide range of environmental conditions as obtained by providing the oxo acid having a hydrocarbon group or a salt thereof and the fluorinated polyether on the surface of the magnetic layer or in the interior thereof.

The following examples are provided to illustrate the novel features and effects of the present invention. It is understood, however, that the examples are intended for illustration only and it is not intended that the present invention be construed to be limited thereby. In the examples, parts and percents are by weight, unless otherwise stated.

EXAMPLE 1

The magnetic coating composition set forth below was kneaded in a ball mill for 48 hours to disperse the components added. 5 parts of a polyisocyanate (Coronate L, manufactured by Nippon Polyurethane Co., Ltd.) was then added thereto. The mixture was further kneaded for one hour to disperse the polyisocyanate. The resulting dispersion was filtered through a filter having an average pore size of 1 μm to prepare a magnetic coating material. The surface of a polyethylene terephthalate support of 10 μm in thickness was coated with the magnetic coating material by means of reverse roll coating in such an amount as to give a dry thickness of 4.0 μm.

| Magnetic Coating Composition | |
|---|---|
| Ferromagnetic alloy powder (composition: Fe 94%, Zn 4%, Ni 12%; coercive force: 1500 Oe; specific surface area: 54 mg/m$^2$) | 100 parts |
| Vinyl chloride/vinyl acetate/maleic anhydride copolymer (400 × 110A manufactured by Nippon Zeon, Co., Ltd.; degree of polymerization: 400) | 12 parts |
| Abrasive (α-alumina, average particle size: 0.3 μm) | 5 parts |
| Carbon black (average particle size: 40 nm) | 2 parts |
| Methyl ethyl ketone | 300 parts |

While the coated magnetic coating material was undried, the coated support was subjected to magnetic field orientation by using a magnet of 3000 gauss and dried. The surface of the magnetic layer was supercalendered and then top-coated with a solution of 5 parts of the compound represented by the formula (9) described above as the salt of the oxo acid having a hydrocarbon group and 5 parts of the compound (number-average molecular weight: 2,000, n=m) represented by the formula (41) described above as the fluorinated polyether dissolved in 1000 parts of 1,1,2-trichloro-1,2,2-trifluoroethane by means of bar coater. The resulting magnetic recording medium was slit into a tape of 8 mm in width, thus preparing a sample of an 8 mm video tape.

The coating weight of the above two kinds of the compounds on the surface of magnetic layer was calculated from the amount of the solution reduced by coating. The combined coating weight of the above two kinds of the compounds was 30 mg/m$^2$.

EXAMPLE 2

The procedure of Example 1 was repeated except that the concentrations of the two kinds of the compounds in the solution were changed so as to give a coating weight of 60 mg/m$^2$ on the surface of the magnetic layer to prepare an 8 mm video tape as a sample.

EXAMPLE 3

The procedure of Example 1 was repeated except that the compound represented by the formula (11) was used as the salt of the oxo acid having a hydrocarbon group to prepare an 8 mm video tape as a sample.

EXAMPLE 4

The procedure of Example 1 was repeated except that the magnetic layer was coated with a solution of 5 parts of the compound represented by the formula (9) as the salt of the oxo acid having a hydrocarbon group dissolved in 995 parts of methanol in such an amount as to give a coating weight of 15 mg/m$^2$ and the coated magnetic layer was dried and coated with a solution of 5 parts of the fluorinated polyether having a number-average molecular weight of 2,000, represented by the formula (44) dissolved in 995 parts of 1,1,2-trichloro-1,2,2-trifluoroethane in such an amount as to give a coating weight of 15 mg/m$^2$ to prepare an 8 mm video tape as a sample.

EXAMPLE 5

The procedure of Example 1 was repeated except that the magnetic layer was coated with a solution of 5 parts of the compound represented by the formula (11) as the salt of the oxo acid having a hydrocarbon group dissolved in 995 parts of methanol in such an amount as to give a coating weight of 15 mg/m$^2$ and the coated magnetic layer was dried and then coated with a solution of 10 parts of the fluorinated polyether having a number-average molecular weight of 2,000, represented by the formula (44) dissolved in 990 parts of 1,1,2-trichloro-1,2,2-trifluoroethane in such an amount as to give a coating weight of 30 mg/m$^2$ to prepare an 8 mm video tape as a sample.

EXAMPLE 6

The procedure of Example 1 was repeated except that the magnetic layer was coated with a solution of a 0.5% methyl ethyl ketone solution of the compound represented by the formula (23) as the salt of the oxo acid having a hydrocarbon group in such an amount as to give a coating weight of 15 mg/m$^2$ and the coated magnetic layer was dried and then coated with a 0.5% solution of the fluorinated polyether having a number-average molecular weight of 2,000, represented by the formula (44) in 1,1,2-trichloro-1,2,2-trifluoroethane in such an amount as to give a coating weight of 30 mg/m$^2$ to prepare an 8 mm video tape as a sample.

EXAMPLE 7

The procedure of Example 1 was repeated except that the magnetic layer was coated with a 0.5% methanol solution of the compound represented by the formula (1) as the oxo acid having a hydrocarbon group in such an amount as to give a coating weight of 15 mg/m$^2$ and the coated magnetic layer was dried and then coated with a 0.5% 1,1,2-trichloro-1,2,2-trifluoroethane solution of the fluorinated polyether having a number-average molecular weight of 2,000, represented by the formula (44) in such an amount as to give a coating weight of 30 mg/m$^2$ to prepare an 8 mm video tape as a sample.

EXAMPLE 8

The procedure of Example 1 was repeated except that the magnetic layer was coated with a solution of 5 parts of fluorinated oil wherein both terminals were modified by addition of carboxyl groups (FOMBLIN Z DIAC, a product of MONTEFLUOS Co., Ltd.), as the oxo acid having a hydrocarbon group dissolved in 995 parts of 1,1,2-trichloro-1,2,2-trifluoroethane in such an amount as to give a coating weight of 15 mg/m$^2$, and the coated magnetic layer was dried and then coated with a solution of 10 parts of the fluorinated polyether having a number-average molecular weight of 2,000, represented by the formula (44) dissolved in 990 parts of 1,1,2-trichloro-1,2,2-trifluoroethane in such an amount as to give a coating weight of 30 mg/m² to prepare an 8 mm video tape as a sample.

COMPARATIVE EXAMPLE 1

The procedure of Example 1 was repeated except that the fluorinated polyether was omitted and the magnetic layer was coated with a 0.5% methanol solution of the compound represented by the formula (9) as the salt of the oxo acid having a hydrocarbon group in such an amount as to give a coating weight of 15 mg/m² to prepare an 8 mm video tape as a sample.

COMPARATIVE EXAMPLE 2

The procedure of Example 1 was repeated except that the fluorinated polyether was omitted and the magnetic layer was coated with a 1% methanol solution of the compound represented by the formula (9) as the salt of the oxo acid having a hydrocarbon group in such an amount as to give a coating weight of 30 mg/m² to prepare an 8 mm video tape as a sample.

COMPARATIVE EXAMPLE 3

The procedure of Example 1 was repeated except that the fluorinated polyether was omitted and the magnetic layer was coated with a 0.5% methyl ethyl ketone solution of the compound represented by the formula (1) as the oxo acid having a hydrocarbon group in such an amount as to give a coating weight of 15 mg/m² to prepare an 8 mm video tape as a sample.

COMPARATIVE EXAMPLE 4

The procedure of Example 1 was repeated except that the fluorinated polyether was omitted and the magnetic layer was coated with a solution of 5 parts of the compound represented by the formula (1) as the oxo acid having a hydrocarbon and 5 parts of butyl stearate dissolved in 1,200 parts of methyl ethyl ketone in such an amount as to give a coating weight (the combined amount of the two lubricants) of 22.5 mg/m² to prepare an 8 mm video tape as a sample.

COMPARATIVE EXAMPLE 5

The procedure of Example 1 was repeated except that both the salt of the oxo acid having a hydrocarbon group and the fluorinated polyether were omitted to prepare an 8 mm video tape as a sample.

EXAMPLE 9

A ferromagnetic metallic thin film (film thickness: 150 nm) composed of cobalt and nickel was formed on a polyethylene terephthalate film of 13 μm in thickness as a non-magnetic support by means of oblique-incidence vapor deposition to prepare a metallic thin film type magnetic recording medium.

An electron beam evaporation source was used as the evaporation source. A cobalt-nickel alloy (Co: 80 wt%, Ni: 20 wt%) was charged and oblique-incidence vapor deposition was carried out in an oxygen stream at an angle of incidence of 50 degrees under vacuum of $5 \times 10^{-5}$ Torr.

The magnetic layer of the ferromagnetic metallic thin film of the metallic thin film type magnetic recording medium was top-coated with a solution of 5 parts of the compound represented by the formula (9) as the salt of the oxo acid having a hydrocarbon group and 5 parts of the compound (number-average molecular weight = 2,000, n=m) represented by the formula (41) as the fluorinated polyether dissolved in 1,000 parts of 1,1,2-trichloro-1,2,2-trifluoroethane by means of a bar coater. The resulting magnetic recording medium was slit into a tape of 8 mm in width, thus preparing a sample of an 8 mm video tape. The combined coating weight of the above two kinds of the compounds was 12 mg/m².

EXAMPLE 10

The procedure of Example 9 was repeated except that the concentrations of the two kinds of the compounds were changed so as to give a coating weight of 40 mg/m² to prepare an 8 mm video tape as a sample.

EXAMPLE 11

The procedure of Example 9 was repeated except that the compound represented by the formula (11) as the salt of the oxo acid having a hydrocarbon group was used to prepare an 8 mm video tape as a sample.

EXAMPLE 12

The procedure of Example 9 was repeated except that the magnetic layer was coated with a solution of the compound represented by the formula (9) as the salt of the oxo acid having a hydrocarbon group dissolved in 995 parts of methanol in such an amount as to give a coating weight of 12 mg/m² and the coated magnetic layer was dried and then coated with a solution of 5 parts of the fluorinated polyether having a number-average molecular weight of 2,000 represented by the formula (44) dissolved in 995 parts of 1,1,2-trichloro-1,2,2-trifluoroethane in such an amount as to give a coating weight of 15 mg/m² to prepare an 8 mm video tape as a sample.

EXAMPLE 13

The procedure of Example 9 was repeated except that the magnetic layer was coated with a solution of 5 parts of the compound represented by the formula (11) as the salt of the oxo acid having a hydrocarbon group dissolved in 995 parts of methanol in such an amount as to give a coating weight of 10 mg/m² and the coated magnetic layer was dried and then coated with a solution of 10 parts of the fluorinated polyether having a number-average molecular weight of 2,000 represented by the formula (44) dissolved in 990 parts of 1,1,2-trichloro-1,2,2-trifluoroethane in such an amount as to give a coating weight of 15 mg/m² to prepare an 8 mm video tape a a sample.

EXAMPLE 14

The procedure of Example 9 was repeated except that the magnetic layer was coated with a 0.5 wt% methyl ethyl ketone solution of the compound represented by the formula (23) as the salt of the oxo acid having a hydrocarbon group in such an amount as to give a coating weight of 10 mg/m² and the coated magnetic layer was dried and then coated with a 0.5 wt% 1,1,2-trichloro-1,2,2-trifluoroethane solution of the fluorinated polyether having a number-average molecular weight of 2,000, represented by the formula (44) in such an amount as to give a coating weight of 20 mg/m² to prepare an 8 mm video tape as a sample.

EXAMPLE 15

The procedure of Example 9 was repeated except that the magnetic layer was coated with a 0.5 wt% methanol solution of the compound represented by the formula (1) as the oxo acid having a hydrocarbon group in such an amount as to give a coating weight of 10 mg/m$^2$ and the coated magnetic layer was dried and then coated with a 0.5 wt% 1,1,2 trichloro-1,2,2-trifluoroethane solution of the fluorinated polyether having a number-average molecular weight of 2,000, represented by the formula (44) in such an amount as to give a coating weight of 20 mg/m$^2$ to prepare an 8 mm video tape as a sample.

EXAMPLE 16

The procedure of Example 9 was repeated except that the magnetic layer was coated with a solution of 5 parts of fluorinated oil wherein both terminals were modified by addition of carboxyl groups (FOMBLIN Z DIAC) as the oxo acid having a hydrocarbon group dissolved in 995 parts of 1,1,2-trichloro-1,2,2-trifluoroethane in such an amount as to give a coating weight of 10 mg/m$^2$, and the coated magnetic layer was dried and then coated with a solution of 10 parts of the fluorinated polyether having a number-average molecular weight of 2,000, represented by the formula (44) dissolved in 990 parts of 1,1,2-trichloro-1,2,2-trifluoroethane in such an amount as to give a coating weight of 20 mg/m$^2$ to prepare an 8 mm video tape as a sample.

COMPARATIVE EXAMPLE 6

The procedure of Example 9 was repeated except that the fluorinated polyether was omitted and the magnetic layer was coated with a 0.5 wt% methanol solution of the compound represented by the formula (9) as the salt of the oxo acid having a hydrocarbon group in such an amount as to give a coating weight of 10 mg/m$^2$ to prepare an 8 mm video tape as a sample.

COMPARATIVE EXAMPLE 7

The procedure of Example 9 was repeated except that the fluorinated polyether was omitted and the magnetic layer was coated with a 1 wt% methanol solution of the compound represented by the formula (9) as the salt of the oxo acid having a hydrocarbon group in such an amount as to give a coating weight of 20 mg/m$^2$ to prepare an 8 mm video tape as a sample.

COMPARATIVE EXAMPLE 8

The procedure of Example 9 was repeated except that the fluorinated polyether was omitted and the magnetic layer was coated with a 10.5 wt% methyl ethyl ketone solution of the compound represented by the formula (1) as the oxo acid having a hydrocarbon group in such an amount as to give a coating weight of 10 mg/m$^2$ to prepare an 8 mm video tape as a sample.

COMPARATIVE EXAMPLE 9

The procedure of Example 9 was repeated except that the fluorinated polyether was omitted and the magnetic layer was coated with a solution of 5 parts of the compound represented by the formula (1) as the oxo acid having a hydrocarbon group and 5 parts of butyl stearate dissolved in 1,200 parts of methyl ethyl ketone in such an amount as to give a coating weight (the combined amount of the two compounds) of 15 mg/m$^2$ to prepare an 8 mm video tape as a sample.

COMPARATIVE EXAMPLE 10

The procedure of Example 9 was repeated except that both the salt of the oxo acid having a hydrocarbon group and the fluorinated polyether were omitted to prepare an 8 mm video tape as a sample.

Each of the samples of the thus-obtained 8 mm video tapes was tested, and output after repeatedly running and a coefficient of friction were measured under the following conditions. The results are shown in Table 1.

Measurement of Output

A signal of 7 MHz was recorded on the tape by using VTR (FUJIX-8, a product of Fuji Photo Film Co., Ltd.). After 300 running passes under environmental conditions at 23° C. and 70% RH over a period of 120 minutes, reproduced output was measured. The reproduced output of 7 MHz recorded on the reference tape was referred to as 0 dB. The relative reproduced output of each video tape sample was measured.

Measurement of a Coefficient of Friction

A sample of 8 mm video tape and a stainless steel pole (diameter: 8 mm) were brought into contact with each other at a winding angle of 180° under a tension (T1) of 50 g. A tension (T2) required for running the 8 mm video tape sample at a speed of 3.3 cm/s was measured. The friction coefficient $\mu$ was calculated from the following formula on the basis of the measured value.

$$\mu = 1/\pi \cdot \ln(T2/T1)$$

The test on the friction coefficient was carried out under two conditions of (a) at 20° C. and 80% RH and (b) at 40° C. and 90% RH.

Further, the coefficient of friction was measured at 23° C. and 70% RH after 200 running passes were repeatedly made at −10° C. and 10% RH over a period of 120 minutes.

TABLE 1

| Sample | Output after Repeatedly Running (dB) | Coefficient of Friction 20° C. 80% RH | Coefficient of Friction 40° C. 90% RH | After Repeatedly Running |
|---|---|---|---|---|
| Example 1 | 0 | 0.20 | 0.20 | 0.22 |
| Example 2 | 0 | 0.20 | 0.20 | 0.20 |
| Example 3 | 0 | 0.21 | 0.22 | 0.22 |
| Example 4 | 0 | 0.19 | 0.20 | 0.20 |
| Example 5 | 0 | 0.20 | 0.21 | 0.22 |
| Example 6 | 0 | 0.22 | 0.23 | 0.24 |
| Example 7 | −1 | 0.23 | 0.23 | 0.25 |
| Example 8 | −1 | 0.23 | 0.23 | 0.30 |
| Comp. Ex. 1 | −1.5 | 0.20 | 0.25 | 0.30 |
| Comp. Ex. 2 | −1 | 0.20 | 0.21 | 0.30 |
| Comp. Ex. 3 | −2 | 0.22 | 0.24 | 0.31 |
| Comp. Ex. 4 | −2.5 | 0.23 | 0.28 | 0.30 |
| Comp. Ex. 5 | could not be measured | at least 0.4 | at least 0.4 | at least 0.4 |
| Example 9 | 0 | 0.18 | 0.18 | 0.18 |
| Example 10 | 0 | 0.19 | 0.19 | 0.19 |
| Example 11 | 0 | 0.20 | 0.20 | 0.20 |
| Example 12 | 0 | 0.19 | 0.19 | 0.19 |
| Example 13 | 0 | 0.19 | 0.19 | 0.19 |
| Example 14 | 0 | 0.20 | 0.20 | 0.20 |
| Example 15 | −2 | 0.21 | 0.22 | 0.24 |
| Example 16 | −1.5 | 0.24 | 0.26 | 0.35 |
| Comp. Ex. 6 | −3 | 0.22 | 0.26 | 0.35 |
| Comp. Ex. 7 | −2 | 0.22 | 0.25 | 0.33 |
| Comp. Ex. 8 | −3 | 0.23 | 0.36 | 0.36 |
| Comp. Ex. 9 | −4 | 0.25 | 0.30 | 0.36 |
| Comp. Ex. 10 | could not | at least | at least | at least |

TABLE 1-continued

| Sample | Output after Repeatedly Running (dB) | Coefficient of Friction | | |
|---|---|---|---|---|
| | | 20° C. 80% RH | 40° C. 90% RH | After Repeatedly Running |
| | be measured | 0.4 | 0.4 | 0.4 |

It is clear from Table 1 that any of the samples of Examples 1 to 16 using a combination of the oxo acid compound having hydrocarbon group with the perfluoropolyether according to the present invention has a low coefficient of friction under both conditions (a) and (b), does not cause an increase in a coefficient of friction after repeatedly running at a low temperature and is stable with regard to performance.

On the other hand, the comparative samples containing no compound according to the present invention the comparative samples containing only the oxo acid compound having a hydrocarbon group without using the perfluoropolyether and the comparative samples containing other combinations have a high coefficient of friction under high temperature and humidity (the condition b), demonstrated a greatly increased coefficient of friction after repeatedly running under low humidity conditions and have problems with regard to stability.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon a magnetic layer comprising a ferromagnetic magnetic metallic thin film including an upper surface, wherein (a) an oxo acid selected from the group consisting of a hydrocarbon-substituted sulfuric ester or a salt thereof and a hydrocarbonsulfonic acid or a salt thereof and (b) a fluorinated polyether are present on said upper surface of said magnetic layer.

2. A magnetic recording medium as in claim 1, wherein the oxo acid having a hydrocarbon group or a salt thereof is mixed with the fluorinated polyether in a mixing ratio of from between 1:10 to 10:1 by weight.

3. A magnetic recording medium as in claim 1, wherein said oxo acid is selected from the group consisting of $RSO_3H$, $RSO_3M$, $ROSO_3H$, $ROSO_3M$, $RSO_2H$, $RSO_2M$, $ROSO_2H$, $ROSO_2M$, and $RSO_3m$ wherein R is a hydrocarbon group and M represents Na, K, Li, $NH_4$, $Zn_{(\frac{1}{2})}$, $Be_{(\frac{1}{2})}$, $Mg_{(\frac{1}{2})}$, $Ca_{(\frac{1}{2})}$, $SR_{(\frac{1}{2})}$, $Co_{(\frac{1}{2})}$, or an atomic group such as primary ammonium, secondary ammonium, tertiary ammonium and quaternary ammonium, but M is not a hydrogen atom.

4. A magnetic recording medium as in claim 1, wherein said fluorinated polyether is a terminal-modified fluorinated polyether or a terminal-unmodified fluorinated polyether.

5. A magnetic recording medium as in claim 4, wherein terminal-modifying groups for the terminal-modified fluorinated polyether are selected from the group consisting of $CH_3OCO-$, $C_2H_5COCO-$, $C_{12}H_{25}OCO-$, $HCOO-$, $CH_3COO-$, $C_2H_5COO-$, $C_{17}H_{35}COO-$, $C_6H_5OCO-$, $C_6H_5COO-$, $-OH$, $-COOH$ and $-SO_3H$.

6. A magnetic recording medium as in claim 1, wherein the thickness of the ferromagnetic metallic thin film is in the range of from 0.02 to 2 μm.

7. A magnetic recording medium as in claim 1, wherein said oxo acid and said fluorinated polyether are coated sequentially on said upper surface of said magnetic layer.

8. A magnetic recording medium as in claim 1, wherein said fluorinated polyether is selected from the group consisting of

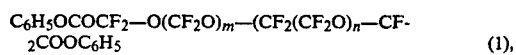 (1),

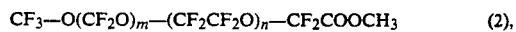 (2),

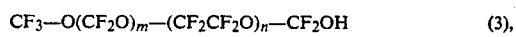 (3),

 (4),

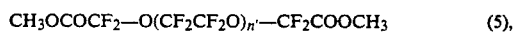 (5),

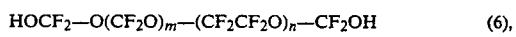 (6),

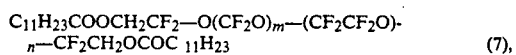 (7),

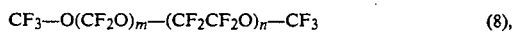 (8),

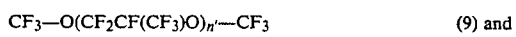 (9) and

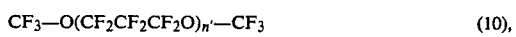 (10), with the provisos that in formulae (1) to (4) and (6) to (8), m and n each represents a positive integer and the sum of m and n ranges from 6 to 15, and in formulae (5), (9) and (10), n' represents a positive integer of from 4 to 25.

* * * * *